Dec. 4, 1956

D. D. GRIEG 2,773,242

MICROWAVE SWITCHING ARRANGEMENTS

Filed April 2, 1952

2 Sheets-Sheet 1

INVENTOR
DONALD D. GRIEG

BY Percy P. Lantzy

ATTORNEY

Dec. 4, 1956 D. D. GRIEG 2,773,242
MICROWAVE SWITCHING ARRANGEMENTS
Filed April 2, 1952 2 Sheets-Sheet 2
Fig.10
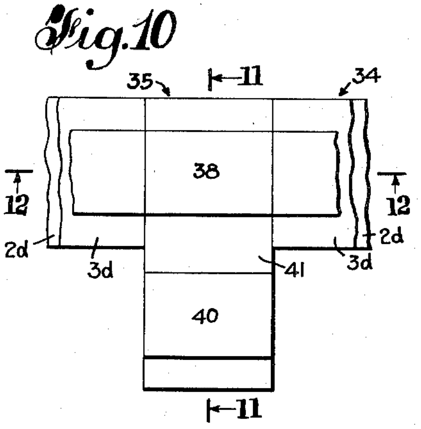
Fig.11
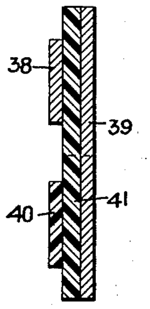
Fig.12
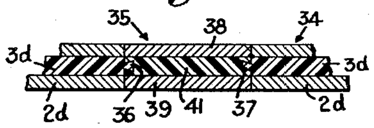
Fig.13
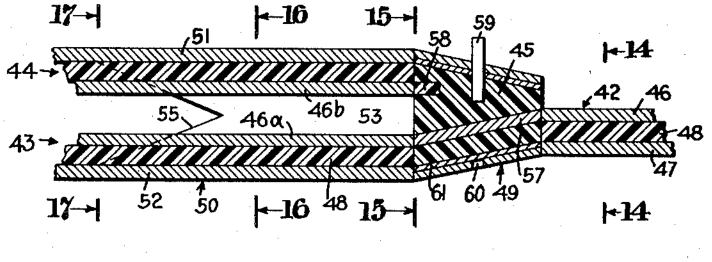
Fig.18
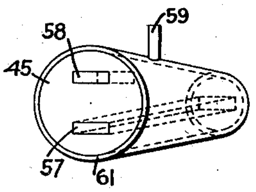
Fig.17 Fig.16 Fig.15 Fig.14
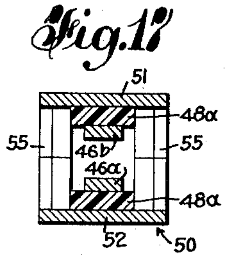
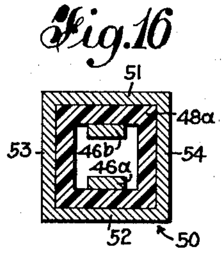
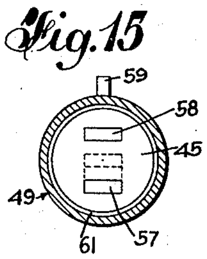
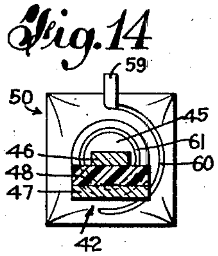
INVENTOR
DONALD D. GRIEG
BY Percy P. Lantzy
ATTORNEY United States Patent Office 2,773,242

Patented Dec. 4, 1956

2,773,242

MICROWAVE SWITCHING ARRANGEMENTS

Donald D. Grieg, North Caldwell, N. J., assignor to International Telephone and Telegraph Corporation, a corporation of Maryland Application April 2, 1952, Serial No. 280,106

2 Claims. (Cl. 333—7)

This invention relates to microwave systems and more particularly to switching arrangements for a new type of microwave transmission line.

In the copending application of D. D. Grieg and H. F. Engelmann, Serial No. 227,896, filed May 23, 1951, now abandoned, and Serial No. 234,503, filed June 20, 1951, now Pat. No. 2,721,312, a new principle of microwave transmission is disclosed, comprising in its simplest form two conductors, one as a "ground conductor" and the other as a "line conductor," spaced close together in substantially parallel relation. The so-called "ground conductor," which may be at ground potential or some other given potential, is preferably wider than the line conductor so that the surface thereof provides in effect an image reflection of the line conductor, whereby the distribution of the electric and magnetic fields between the conductors is substantially the same as the distribution between one conductor and the neutral plane of a theoretically perfect two-conductor parallel system. Small variations in size and shape of the line conductor may produce variations in the characteristic impedance of the system but the field distribution with respect to the ground conductor is not materially disturbed, or if disturbed it quickly stabilizes itself. Likewise, certain variations in the surface of the ground conductor do not materially disturb the field distribution with respect to the surface thereof since such variations either neutralize each other or do not adversely affect for any appreciable duration the field distribution between the two conductors. By this system, microwaves can be propagated in substantially the TEM mode along the line-ground conductor system since the microwaves flow along the opposed surface of skin portions of the conductors which define the opposed conductive boundaries for the concentrated regions of the electromagnetic field.

One of the objects of this invention is to provide switching arrangements for transmission lines of the character referred to above.

Another object is to provide switching arrangements for microwave transmission systems wherein one or more terminals of the switch are terminated with matched loads when such terminals are "opened."

The above-mentioned and other features and objects of this invention will become more apparent by reference to the following description taken in conjunction with the accompanying drawings, wherein.

Figure 7:
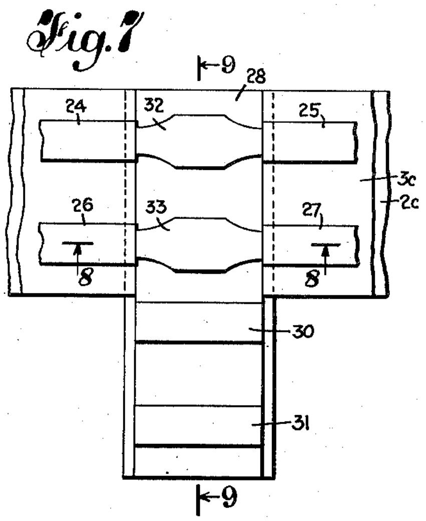
Fig. 7 is a view in plan of another form of two line switch.
Figure 8:
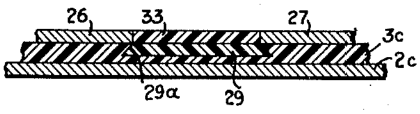
Figure 9:
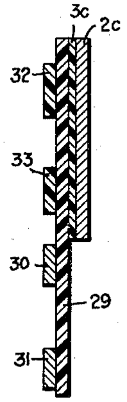

Figs. 8 and 9 are cross-sectional views taken along lines 8—8 and 9—9 of Fig. 7, respectively;

Fig. 10 is a plan view of a modified form of sliding switch wherein both the line conductor and the ground conductor are severed in switch open position;

Figs. 11 and 12 are sectional views taken along lines 11—11 and 12—12 of Fig. 10;

Fig. 13 is a longitudinal sectional view of a two-way switch;

Figs. 14, 15, 16 and 17 are cross-sectional views taken along lines 14—14, 15—15, 16—16, and 17—17 of Fig. 13; and Fig. 18 is a view in perspective of a rotary core for the switch shown in Figs. 13 to 17.

Figure 1:
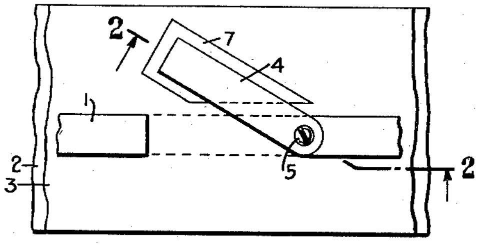
Fig. 1 is a view in plan of one form of switch in accordance with the principles of this invention.
Figure 2:
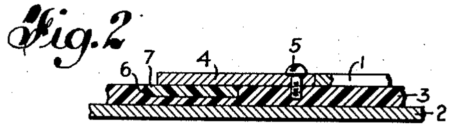
Fig. 2 shows a cross-sectional view taken substantially along line 2—2 of Fig. 1.

Referring to Figs. 1 and 2 of the drawings, one form of switch is shown comprising transmission line segments of the "line-above-ground" type. Preferably the segments are substantially identical to the conductors of the line, that is of the printed circuit type comprising a first or "line" conductor 1 and a second or "ground" conductor 2 with a layer 3 of insulating material therebetween. The conductive material may be applied to the layer of insulation, such as polystyrene, polyethylene, "Teflon," or other suitable insulation of high dielectric quality, in the form of conductive paint or ink, or the conductive material may be chemically deposited, sprayed through a stencil or dusted onto selected prepared surfaces of the insulation according to known printed circuit techniques. For relatively short lengths of lines the conductive strips may be cut and applied by a die-stamping operation. In some cable manufacturing processes, the insulation may be extruded and simultaneously or later coated on the two sides thereof with conductive material of the desired thickness and widths. Where the widths of the two coatings are the same and it is desired to reduce the width of one of the coatings, the portions of the two coatings that are to be retained may be coated with a chemically inert material exposing the parts to be removed, and thereafter passed through an etching bath, whereupon the exposed portions of the conductive coatings are removed. While the two conductive coatings 1 and 2 are shown to be substantially rectangular, they may comprise different shapes so long as the ground conductor 2 presents a relatively wide extended surface with respect to the line conductor. Preferably, the ground conductor should be from two to three times the width of the line conductor 1 to simulate a conductor of infinite extent. The electric field concentrated between the parallel surfaces of line-to-ground conductors for a ratio of widths of 1 to 3 is found to range from about 95 percent to approximately 99 percent. From the foregoing it is clear that a ground conductor only slightly wider than the line conductor may be used without much radiation loss, and where it can be three or more times the width of the line conductor, an exceptionally low loss transmission line is assured. As the two conductors approach equal size the field concentration therebetween becomes more and more critical with increased side radiations. For further information on various "line-above-ground" cable constructions, reference may be had to the aforementioned copending application, Serial No. 234,503.

From the foregoing description of a line-above-ground transmission system, it will be clear that such a conductor arrangement is similar to a rectangular waveguide especially where the line conductor is of flat strip form. Whether or not the line conductor is round, oval, or flat, wave propagation is predominantly of one polarization, that is, the concentration of lines of electrical force 4 are substantially perpendicular to the opposed surfaces of the line and ground conductors. The spacing of the two conductors is preferably selected a very small fraction of a wavelength of the microwave propagated therealong and that this spacing is usually less than the diameter or width of the line conductor 1.

The switch shown in Figs. 1 and 2 comprises a pivoted segment 4 substantially identical to the line conductor 1, the segment being pivoted as indicated by pin 5 which may comprise conductive metal or dielectric material. In either case, when the switch portion 4 is in closed position with the line conductor terminals the material of the pin has substantially no effect on the flow of current along the line. The discontinuity presented by the pin is small and any higher order modes initiated thereby are rapidly attenuated due to the close spacing of the line-ground conductors which provide for a concentrated electric field therebetween. The layer of dielectric material 3 is recessed as indicated at 6 to provide for a layer of resistive material 7. The material 7 may comprise certain paints, enamels, phenolic dielectric, or a lossy conductor such as aquadag, iron or resistive alloy. The layer of resistive material 7 is preferably disposed and shaped so that when the switch segment 4 is moved to open position the arm overlies the layer 7. The resistive characteristic of the material 7 provides a matched termination for the opened end of the circuit. Instead of having the resistive material contained in a recess it may be in the form of an overlapping card beneath which the segment 4 is movable. The switch as well as those hereinafter described may be made a part of a transmission line or printed circuit or they may be provided with line terminals adapted for coupling in a line or circuit.

Figure 3:
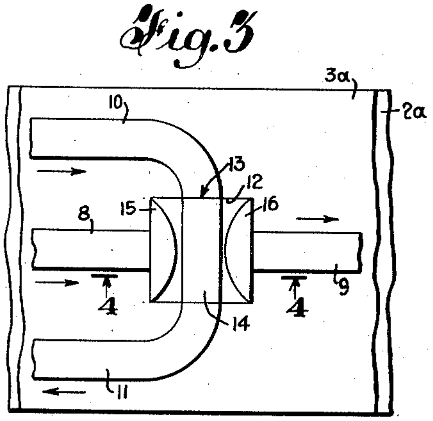
Fig. 3 is a view in plan of a switch for controlling alternately the flow of current over two associated lines.
Figure 4:
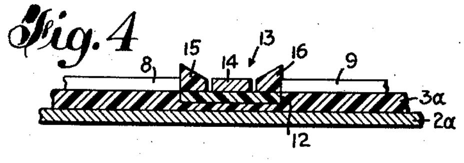
Fig. 4 is a cross-sectional view taken along line 4—4 of Fig. 3.

In Figs. 3 and 4 a modified form of switch is illustrated, wherein the switch may be operated to alternately connect two separate lines. One such line is shown by an input connection 8 and an output connection 9. The other line is shown with an input connection 10 and an output connection 11. These input and output connections comprise line conductors carried by a layer of insulation *3a* with a layer of conductive material *2a* on the opposite side. The four connections or terminals 8, 9, 10 and 11, are disposed at right angles where they terminate at a recess 12 in the dielectric material *3a*. The recess may be of any desired shape, for example, circular or rectangular, or other form as may be desired. In the present illustration, the recess is shown to be rectangular and to contain a rectangular block of insulating material 13 on which a conductor segment 14 is supported for connecting two of the lines, such as 10, 11 as shown in Fig. 3. Adjacent the conductor segment 14 are two bodies of resistive material 15 and 16 so positioned that they are in alignment with the ends of terminals 8 and 9. These bodies are so designed as to provide a matched termination for the lines 8 and 9. When the switch is turned so that these bodies are in alignment with the ends of connections 10 and 11 they provide matched terminations for those lines. Where the switch is of rectangular form as shown, it is preferable to provide means for gripping the switch body so that it may be lifted and reset at 90° to its former position for switching operation. For lifting purposes the resistive bodies 15 and 16 are made to extend up above the surface of the line conductors.

Figure 5:
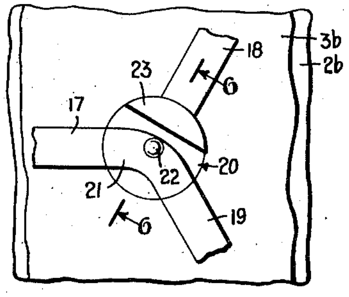
Fig. 5 is a view in plan of a three-way switch.
Figure 6:
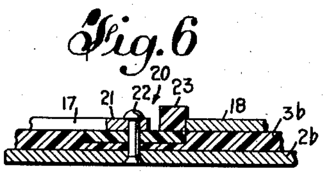
Fig. 6 is a cross-sectional view taken substantially along line 6—6 of Fig. 5.

Instead of a rectangular switch body, it may be made circular and pivoted so that the switching operation is obtained by a rotary motion. Such a rotary switch is shown in Figs. 5 and 6. This switch is of the three-way type comprising terminal line conductors 17, 18 and 19 supported on a conductor backed layer of dielectric material *3b*. The switching body 20 is circular and is contained in a circular recess formed in the layer *3b*. Where the conductive backing *2b* is of sufficient strength to support the switching body, the body 20 may extend to the surface of the conductor *2b*. Where the conductor *2b* comprises a thin layer of conductive material insufficient to support the switch body, it is preferable to provide the recess only partially through the layer *3b*, as shown in the form illustrated in Fig. 4. The switching body 20 carries a line conductor 21 of arcuate form which will provide a line connection between selected pairs of the three lines 17, 18 and 19. The switch body 20 may rest within the recess or it may be pivoted on a pin 22 of dielectric material extending through the center of the body and keyed at the bottom side where it extends through the conductor *2b*. The switch 20 also carries a body of resistive material 23 adjacent the peripheral portion thereof so that when two of the lines are connected by the switch segment 21 the other lines, such as 18 in Fig. 5 is terminated by the resistive material 23.

Another form of switch is shown in Figs. 7, 8, and 9, whereby two circuit lines 24, 25 and 26, 27 may be simultaneously opened or separately opened, depending on the extent of movement of the switch body 28. The lines 24, 25, and 26, 27 are carried by a layer of dielectric material *3c* which is backed by a layer of conductive material *2c*. The layer of dielectric material *3c* is recessed thereacross between the ends of the two lines 24, 25 and 26, 27. The switch body 28 is adapted to slide within the recess although it may be lifted and reversed for switching operation depending on the length of the recess. As shown in Figs. 7, 8 and 9, the switch body 28 comprises a plate of dielectric material 29, one portion of which is provided with two conductor segments 30 and 31 which when the body 28 is properly positioned connect the lines 24, 25 and 26, 27, respectively. In the open position shown in Fig. 7, the segments 30 and 31 are displaced with respect to the two lines. In the adjacent portion of the switch body 28 are provided with bodies of resistive material 32 and 33 which are disposed in the gap between the lines when the switch is in open position thereby terminating the lines with matched loads. These bodies of resistive material are so shaped and/or varied in density as to provide the desired load transition effect free of reflections.

In all of the switch embodiments thus far described only the line conductor portion is movable. It should be understood, of course, that in each of these forms the ground conductor portion may also be displaced when the line conductor is displaced. In Fig. 10 a modified form of sliding switch similar to the form illustrated in Figs. 7, 8 and 9 is shown for controlling a transmission line 34, wherein both the line conductor and the ground conductor are severed during switch open position. The adjacent sides of the switch body 35 and the layer of dielectric *3d* are provided with tongue and groove connections 36 and 37 whereby the body is slidably retained in the line. The switch body is provided with a conductor segment 38 for closing the line 34 and a second conductor segment 39 for providing a continuation of the ground conductor *2d*. The switch 35 also includes two bodies 40 and 41 of resistive material disposed adjacent the conductors 38 and 39 so that when the switch is moved to open position the bodies 40 and 41 are moved into alignment with the circuit terminations thereby providing matched loads for the open terminations.

The switch shown in Figs. 13 through 18 is of the two-way type comprising a main line connection or terminal 42, two branch line connections or terminals 43 and 44 and a rotatable switching member 45 for selectively connecting the main terminal 42 to one or the other of the branch terminals 43 and 44. Each terminal comprises the strip type of line including a line or first conductor 46, a ground or second conductor 47 and a layer 48 of dielectric material therebetween. The conductor 47 is common to all three terminals, it being transformed from a flat strip, as indicated in the sectional view of Fig. 14, to a hollow frusto-conical section 49, Figs. 13 and 14, and from there into a hollow rectangular housing 50, Figs. 13, 15 and 16. The upper and lower walls 51 and 52 as viewed in Figs. 13, 15 and 16 form continuations of the ground conductors for the branch terminals 43 and 44, the side walls 53 and 54 being cut away at an angle as indicated at 55, Figs. 13 and 17. While the dielectric material *48a* is shown disposed along the inner surfaces of all walls 51 to 54, it may be omitted from the side walls 53 and 54 if desired. Also, one of the walls 53 or 54 could be omitted if desired so long as one wall or some other supporting structure is provided for maintaining the upper and lower walls 51 and 52 in a desired spaced relation.

The switch member 45 is shown in perspective in Fig. 18 and comprises a frusto-conical member adapted to be received within the hollow frusto-conical conductor 49. The placing of the member 45 within housing 49 may take place before the portions 49 and 50 are secured together. The member 45 comprises a body 56 of dielectric material which has disposed therein a conductor segment 57 and a resistive body 58. Connected to the body is a pin 59 adapted to extend through a slot 60 contained in the housing 49 for switch manipulation. In the position shown in Fig. 13 the conductor segment 57 abuts the end of the line conductor 46 of the terminal 42 and the line conductor **46*a* of branch terminal 43 thereby providing a direct coupling between the line conductors of terminals 42 and 43. The resistive body 58 is disposed in abutting relation to the line conductor 46*b* of terminal 44 thereby terminating that line in its characteristic impedance. In order to provide an extended conductive surface closely adjacent the segment conductor 57 for all positions thereof, the outer surface of the member 45 is provided with a layer 61 of conductive material. This layer bridges the slot 60 and insures a continuous conductive surface adjacent conductor 57**.

While the switch shown in Figs. 13 to 18 is illustrated as having only two branch terminals, it will be clear to those skilled in the art that only one such branch may be used or a greater number than two branch terminals may be provided. It is also clear that since the switch member is coated with a layer of conductive material for coupling between the second conductors of the terminals that the member 45 could be rotated by a motor drive at a desired rate for sample coupling sequentially a plurality of branch terminals.

When it is desired to switch from terminal 43 to 44 the member 45 is moved by manipulation of the pin 59 through 180° thereby moving the sector conductor 57 to a coupling relation between the line conductor 46 and the line conductor **46*b* of terminals 42 and 44. This movement also changes the position of resistive body 58 for alignment with the end of line conductor 46*a*. Regardless of the position of the conductor 57, whether coupled to the line conductor of terminal 43 or 44, the microwaves are conducted therealong in the opposed skin portions of the conductor 57 and the adjacent conductive layer 61. The transition of the electric field spirals from one radial direction at terminal 42 to the opposite radial direction at terminal 44. When the segment 57** is in the position shown in Fig. 13 no rotating transition is required.

While the conductor segment 57 of the switch member 45 is adapted to be revolved with the member 45 from one switching position to another, it will be clear to those skilled in the art that a conductor segment similar to the one shown may be flexed from one switching position to the other by making the conductor resilient. A suitable resilient conductor would comprise a steel spring leaf suitably coated with copper or whichever other conductive material that may be used for the line conductors of the terminals. Such dual metal construction is possible since the microwaves flow only skin deep. Such flexing conductor may also be of a bi-metallic character whereby changes of temperature would produce the desired flexing.

While I have described above the principles of my invention in connection with specific apparatus, it will be clear to those skilled in the art that many switching variations are possible without departing from the principles of this invention. For example, in the embodiment illustrated in Figs. 10, 11 and 12, the tongue and groove sliding arrangement may be replaced by other sliding structures. Where the ground plane **2*d* is extended a distance greater than that shown in Fig. 11, the sliding switch may be disposed within a recess contained in the extended portion of the ground conductor and dielectric layer. In such arrangement it may be desirable to provide a second layer of dielectric material on the bottom side of the ground conductor to provide a supporting connection between the two lines 33 and 34** in which case the switch body may slide on such material. It is to be clearly understood, therefore, that this description is given by way of example only and not as a limitation to the scope of the invention as set forth in the objects thereof and in the accompanying claims.

I claim:

1. In combination, a switching member and a plurality of transmission lines including at least a first, second and third transmission line terminating at given distances from each other, each of said transmission lines comprising a planar strip of solid dielectric material, a first planar conductor lying flat against one face of said dielectric strip, a second planar conductor lying flat against the opposite face of said dielectric strip, said conductors extending parallel to each other, said dielectric strips spacing said conductors a fraction of a quarter wavelength apart, said second conductor being wider than the corresponding first conductor so that the electric field of a wave traveling along said transmission line is distributed between said conductors in a manner approximating the TEM mode, said switching member comprising a transmission line segment including a first conductive segment, a second wider conductive segment, a dielectric member extending the full length between said segments and separating them by a thickness of dielectric which is equal to the thickness of said dielectric strips, at least a portion of said dielectric member being movable, said first conductive segment being carried by said movable dielectric portion into and out of coupling position in which it couples together said first conductors of said first and second transmission lines, said second conductive segment of said switching member coupling said second conductor of said first and second transmission lines to the second conductor of said third transmission line, and a terminating impedance embedded in and terminating in the dielectric for absorbing microwave energy propagated along the line and carried on said movable dielectric portion and movable therewith into immediate contact with the terminating end of said first conductor of said third transmission line when said first conductive segment is in said couping position and out of relationship therewith when said first conductive segment is out of said coupling position.

2. The combination according to claim 1, in which said transmission lines are parallel to each other, with the second and third transmission lines terminating opposite and at equal distances from said first transmission line and said switching member is interposed therebetween, and means for mounting said dielectric portion for rotation about a given axis parallel to said transmission lines and in a position such that, upon rotation of said dielectric member about its axis into a second coupling position, said first conductive segment couples together said first conductors of said first and third transmission lines and said terminating resistance is in immediate contact with the termination of said first conductor of said second transmission line.

References Cited in the file of this patent

UNITED STATES PATENTS

| | | |
|---|---|---|
| 2,344,780 | Kram et al. | Mar. 21, 1944 |
| 2,409,449 | Sanders et al. | Oct. 15, 1946 |
| 2,432,230 | Dorne | Dec. 9, 1947 |
| 2,432,476 | Hesse | Dec. 9, 1947 |
| 2,549,721 | Straus | Apr. 17, 1951 |
| 2,565,643 | Baddour | Aug. 28, 1951 |
| 2,629,048 | Dyke et al. | Feb. 17, 1953 |
| 2,721,312 | Grieg et al. | Oct. 18, 1955 |